United States Patent
Taylor

(10) Patent No.: US 6,519,281 B1
(45) Date of Patent: Feb. 11, 2003

(54) JITTER MEASUREMENT

(75) Inventor: David Finlay Taylor, Edinburgh (GB)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/494,375

(22) Filed: Jan. 31, 2000

(51) Int. Cl.$^7$ ................................................. H04L 1/00
(52) U.S. Cl. ........................................ 375/226; 375/350
(58) Field of Search .............................. 375/226, 316, 375/340, 350, 354, 371; 702/69; 370/516

(56) References Cited

U.S. PATENT DOCUMENTS 4,370,749 A * 1/1983 Levy et al. ................. 327/146
5,299,257 A * 3/1994 Fuller et al. ................ 358/406
5,490,199 A * 2/1996 Fuller et al. ................ 379/1.04
5,757,652 A * 5/1998 Blazo et al. ................ 375/371

* cited by examiner

Primary Examiner—Amanda T. Le

(57) ABSTRACT

Jitter measuring equipment includes timing recovery circuitry with a first filter having a Gaussian-family response to enable the equipment to tolerate relatively long runs of data symbols of a single value without affecting the accuracy of timing of clock recovery. Potential distortion of the jitter measurement which could arise from this amplitude response characteristic is alleviated by applying the demodulated baseband signal, prior to jitter measurement, to a demodulated filter having an amplitude response characteristic that is approximately the inverse of the response of the first filter.

18 Claims, 2 Drawing Sheets

JITTER MEASUREMENT

TECHNICAL FIELD

This invention relates to the measurement of jitter in a digital signal.

BACKGROUND ART

In a digital communications system information is transferred by varying a parameter (such as signal amplitude or phase offset) of a signal among a predetermined number of specific values. Typically changes from one parameter value to another are controlled to occur at regular intervals defined by a timebase or clock signal. Identification of the parameter values in a received signal is likewise controlled to occur at these regular intervals, for example in synchronism with transitions in a clock signal in the receiver. Jitter comprises errors in the timing of occurrence of the clock signal transitions, relative to the timing of transitions in an ideal clock signal which would give optimal recovery of the data in the received signal. Jitter can be caused by varying time delays in circuit paths from component to component in the signal path, for example as a result of poor design of elements such as phase locked loops (PLL's) and waveform distortion due to mismatched impedances and/or reflections in the signal path.

In many telecommunications applications a system is required to "recover" a clock signal from an incoming optical/electrical data signal. A design trade-off commonly encountered is between the ability of the system to operate with variable mark/space density data patterns (which cause variations in the intervals between signal transitions from which a clock signal can be recovered) and its ability to operate adequately in the presence of jitter. In the case of a system for measuring jitter there is a related design trade-off between the frequency flatness and accuracy of a timing recovery filter (TRF) used for clock recovery, and the ability of the measuring system to operate correctly with variable mark/space density data patterns. This latter requirement corresponds to the system's ability to operate with periods of no timing information to co-ordinate clock recovery, that is periods of continuous runs of a single data value (such as ones or zeroes in a binary system).

Previous jitter measurement solutions have used a TRF with a flat amplitude response against frequency over the bandwidth of interest, in order to meet the technical requirements of the jitter measurement sub-system. This flat amplitude response ensures the jitter is not altered by the measurement equipment before phase demodulation and final jitter measurement. However, the impulse response of a TRF, with such a flat response in the frequency domain is oscillatory (i.e. it "rings"), and this can lead to signal transitions in its output signal which can be mistaken for clock transitions. As a result the ability of a system with a flat-response TRF to tolerate periods of continuous single-value data runs without yielding errors in the jitter measurement can be limited. Therefore in typical known systems the jitter measurement capabilities may be acceptable but the ability to operate with different digital test patterns, and in particular with "live" traffic is not.

It is an object of this invention to provide a jitter measurement method and apparatus which can tolerate longer runs of one value of data symbol than can such known apparatus.

DISCLOSURE OF INVENTION

According to one aspect of this invention there is provided a method for measuring jitter in a digital signal, comprising the steps of:

receiving a digital signal;

recovering a clock signal from the digital signal by using a first filter;

demodulating the recovered clock signal;

filtering the demodulated signal with a second filter having a filter characteristic which is approximately inverse to the baseband amplitude response of the first filter; and measuring the jitter of the filtered demodulated signal.

According to another aspect of this invention there is provided apparatus for measuring jitter in a digital signal, comprising:

a receiver for receiving a digital signal;

a clock recovery module coupled to the receiver and incorporating a first filter, for recovering a clock signal from the digital signal;

a demodulator coupled to the clock recovery module for demodulating the recovered clock signal;

a second filter coupled to the demodulator for filtering the demodulated signal, said second filter having a filter characteristic which is approximately inverse to the baseband amplitude response of the first filter; and a jitter measuring module coupled to the second filter for measuring the jitter of the filtered demodulated signal.

BRIEF DESCRIPTION OF DRAWINGS

A method and apparatus in accordance with this invention, for measuring jitter in a digital signal, will now be described, by way of example, with reference to the accompanying drawings, in which.

BEST MODE FOR CARRYING OUT THE INVENTION, & INDUSTRIAL APPLICABILITY

Figure 1:
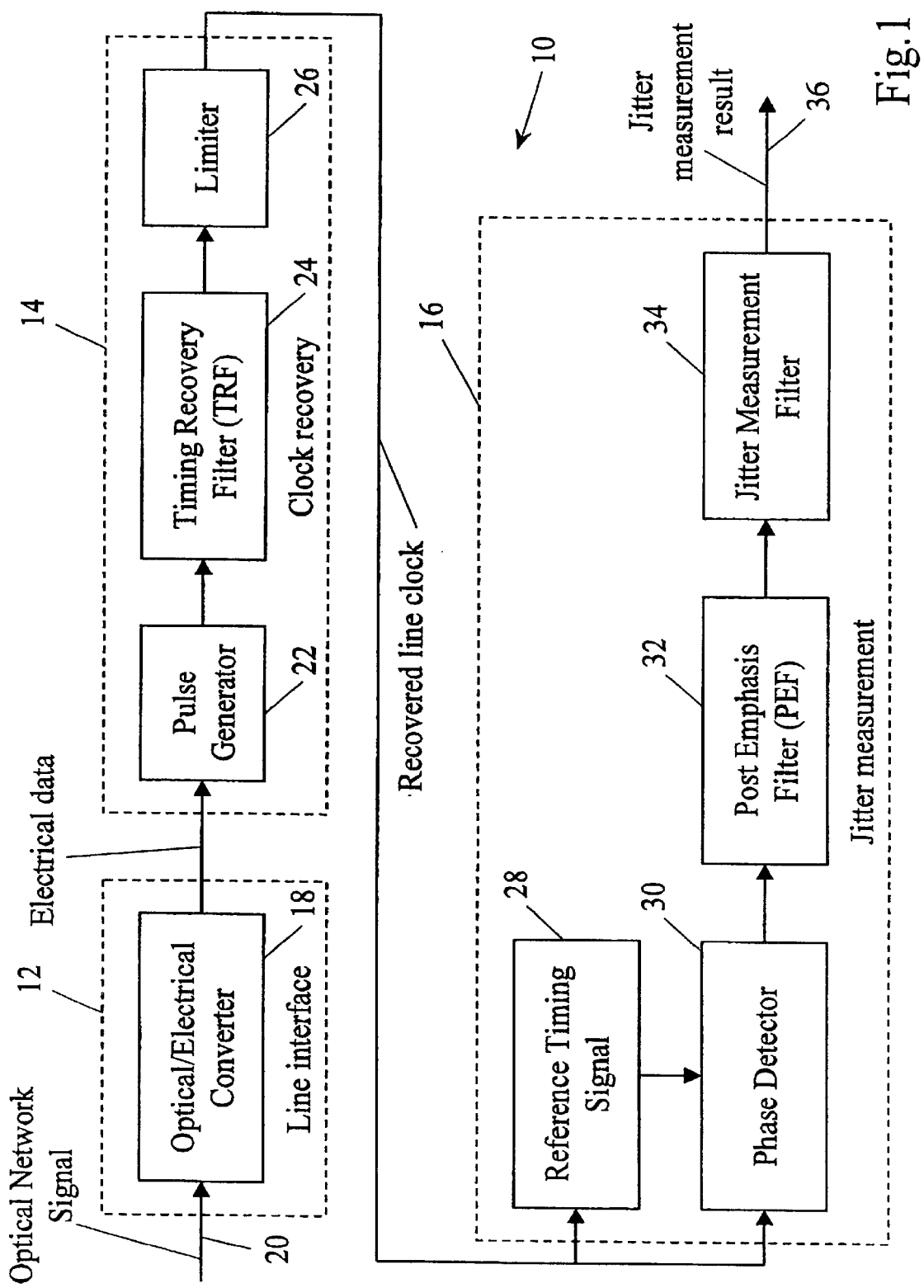
FIG. 1 is a schematic block diagram of the apparatus.

Referring to FIG. 1, a jitter measurement apparatus 10 for measuring jitter in signals at, for example, approximately 2.5 GHz or 10 GHz comprises a line interface section 12, a clock recovery section 14 and a jitter measurement section 16.

The line interface section 12 contains an optical/electrical converter 18 which receives an optical input signal on a line 20 from an optical communications equipment or network (not shown), and supplies an electrical signal containing the same information to the clock recovery section 14. The design and implementation of such a converter are well known to those skilled in this art.

Within the clock recovery section 14 this electrical signal is supplied to a pulse generator 22 which, for example, differentiates the signal to generate a brief pulse upon the occurrence of each amplitude transition in the electrical signal. The pulses are rectified and supplied to a timing recovery filter (TRF) 24 which comprises a "Gaussian-family" filter and produces a transient, quasi-sinusoidal oscillatory signal at the line clock frequency in response to each pulse. The Gaussian-family filter can be any one of a true Gaussian-response filter, a Bessel-response filter or an equal-ripple-delay filter. The filtered oscillatory signal is passed to a limiter 26 which clips the signal peaks to produce a pulse train with a pulse repetition frequency related to the clock rate at which the data were transmitted. The design and implementation of the pulse generator 22 and the limiter 26 follow conventional principles. Likewise, the construction of a Gaussian-family filter as such is known to those skilled in the art.

The recovered line clock signal constituted by this pulse train is supplied to the jitter measurement section 16, specifically to a reference timing signal generator 28 and a phase detector 30 which uses the reference timing signal to demodulate the clock signal and extract a signal at the baseband frequency. The signal generator 28 and the phase detector 30 may each be designed according to conventional principles. The extracted baseband signal is passed through a filter 32 identified herein as a "post-emphasis" filter (described in more detail below), to a jitter measurement filter 34 which operates in conventional manner to yield a jitter measurement value which is output on a line 36.

Figure 2:
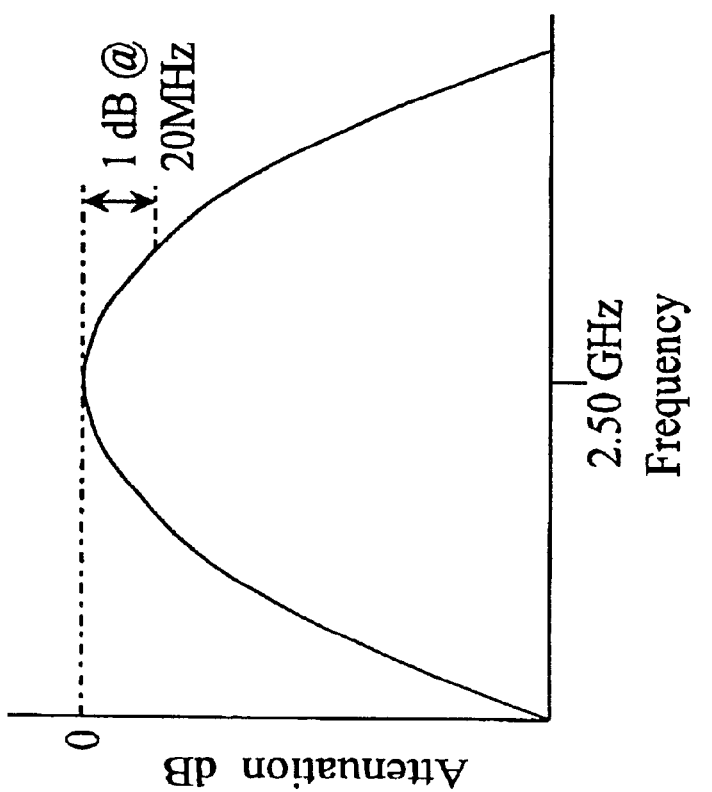
FIG. 2 shows an amplitude response of a timing recovery filter in the apparatus.

The amplitude response characteristics of the TRF 24 are selected to modify its impulse response as compared to TRF's used in prior jitter measurement equipment, and thus improve its ability to operate with longer runs of symbols of a single value. As noted above, a Gaussian-family type of response is adopted, corresponding to the amplitude response in the frequency domain shown in FIG. 2. However as is evident from FIG. 2 this results in a TRF 24 with an amplitude response which is not flat, and therefore potentially causes errors in the jitter amplitude measurement arising from distortion of the signal modulation (e.g. phase shifts) by the TRF 24. This potential distortion is compensated in the phase demodulated baseband output by the post-emphasis filter (PEF) 32, which corrects for the amplitude errors introduced by the TRF 24. Thus frequency-domain errors are corrected in the demodulated baseband domain. This correction is an approximation which the inventor hereof has shown by simulation and experiment gives negligible errors in the jitter measurement range of a typical instrument.

Figure 3:
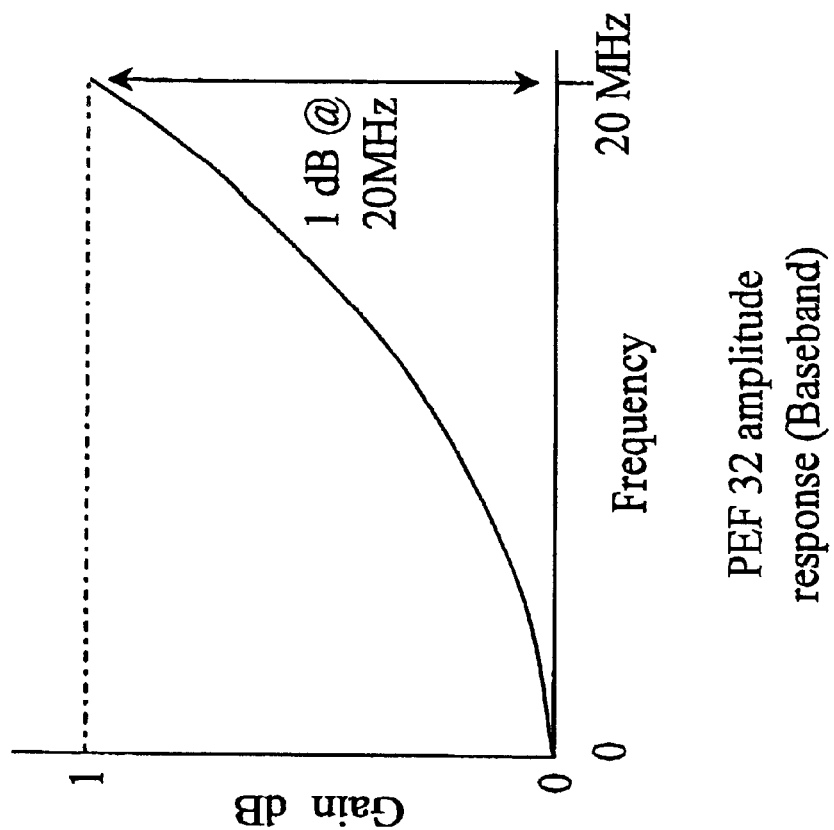
FIG. 3 shows a baseband amplitude response of a post-emphasis filter in the apparatus.

The amplitude response of the PEF 32 is, as shown in FIG. 3, in general terms inverse to the (baseband) amplitude response of the TRF 24. Thus the amplitude of the output signal from the PEF 32 increases with increasing frequency, to around 1dB greater amplitude at 20 MHz relative to the amplitude at 0 MHz Typically the rate of increase of amplitude with increase in frequency is greater at higher frequencies. The precise response of the PEF 32 for a specific circuit can be determined using circuit simulation tools to adjust the detailed design parameters of the PEF 32 to give the required accuracy of jitter measurement over the desired bandwidth. In practice the amplitude response of the PEF 32 may be found to have a square-law, an exponential or a hyperbolic characteristic.

The invention thus allows the same jitter measurement bandwidth to be specified for the jitter measurement system as in previous instruments (e.g. 20 MHz), while providing increased tolerance to continuous runs of a single data symbol value. For example, runs of 40–50 zero symbols (as required in several communications standards) can be tolerated, as compared to approximately 30 successive such symbols for previous circuits.

What is claimed is:

1. A method for measuring jitter in a digital signal, comprising the steps of:

receiving a digital signal;

recovering a clock signal from the digital signal by using a first filter;

demodulating the recovered clock signal;

filtering the demodulated signal with a second filter having a filter characteristic which is approximately inverse to the baseband amplitude response of the first filter; and measuring the jitter of the filtered demodulated signal.

2. The method of claim 1, wherein said filter characteristic is any one of a square-law characteristic, an exponential characteristic and a hyperbolic characteristic.

3. The method of claim 1, wherein the first filter is a Gaussian-family filter.

4. The method of claim 3, wherein the first filter is a Bessel filter.

5. Apparatus for measuring jitter in a digital signal, comprising:

a receiver for receiving a digital signal;

a clock recovery module coupled to the receiver and including a first filter, for recovering a clock signal from the digital signal;

a demodulator coupled to the clock recovery module for demodulating the recovered clock signal;

a second filter coupled to the demodulator for filtering the demodulated signal, said second filter having a filter characteristic which is approximately inverse to the baseband amplitude response of the first filter; and a jitter measuring module coupled to the second filter for measuring the jitter of the filtered demodulated signal.

6. The apparatus of claim 5, wherein said filter characteristic is any one of a square-law characteristic, an exponential characteristic and a hyperbolic characteristic.

7. The apparatus of claim 5, wherein the first filter is a Gaussian-family filter.

8. The apparatus of claim 7, wherein the first filter is a Bessel filter.

9. A method of enabling jitter of a digital signal to be indicated, comprising the steps of:

recovering a clock signal from the digital signal, the recovering step including filtering pulses resulting from amplitude transitions of the digital signals by a first filtering process having a known amplitude versus frequency response;

demodulating the recovered clock signal; and filtering the demodulated signal by a second filtering process having an amplitude versus frequency response which is approximately inverse to the baseband amplitude response of the first filtering process.

10. A method of claim 9 wherein the first filtering process produces a transient quasi-oscillating signal in response to each of the transitions.

11. The method of claim 9, wherein said second filtering process is any one of a square-law process, an exponential process and a hyperbolic process.

12. The method of claim 9, wherein the first filtering process is a Gaussian-family filter.

13. The method of claim 12, wherein the first filtering process is a Bessel filter.

14. Apparatus for enabling jitter in a digital signal to be indicated, comprising:

a clock recovery arrangement connected to be responsive to the digital signal for recovering a clock signal from the digital signal coupled to the receiver, the clock recovery arrangement including a first filter arrangement for recovering a clock signal from the digital signal, the first filter arrangement having a known amplitude versus frequency response;

a demodulator coupled to the clock recovery arrangement for demodulating the recovered clock signal; and a second filter arrangement coupled to the demodulator for filtering the demodulated signal, said second filter arrangement having a baseband amplitude versus frequency response which is approximately inverse to the amplitude versus frequency response of the first filter arrangement.

15. An apparatus of claim 14 wherein the first filter arrangement produces a transient quasi-oscillating signal in response to each of the transitions.

16. The apparatus of claim 14, wherein said first filter arrangement response is any one of a square-law characteristic, an exponential characteristic and a hyperbolic characteristic.

17. The apparatus of claim 14, wherein the first filter arrangement is a Gaussian-family filter.

18. The apparatus of claim 17, wherein the first filter arrangement is a Bessel filter.

* * * * *